United States Patent
Camus et al.

(10) Patent No.: US 7,144,947 B2
(45) Date of Patent: Dec. 5, 2006

(54) AMPHIPHILIC COPOLYMERS USEFUL ESPECIALLY AS EMULSIFIERS

(75) Inventors: Elise Camus, Etoile sur Rhone (FR); Claire Brachais, Chenove (FR); Stéphane Auguste, Varois et Chaignot (FR)

(73) Assignee: Laboratories d'Hygiene et de Dietetique, Chenove (FR)

( * ) Notice: Subject to any disclaimer, the term of this patent is extended or adjusted under 35 U.S.C. 154(b) by 350 days.

(21) Appl. No.: 10/399,698

(22) PCT Filed: Oct. 18, 2001

(86) PCT No.: PCT/FR01/03226

§ 371 (c)(1), (2), (4) Date: Apr. 17, 2003

(87) PCT Pub. No.: WO02/32391

PCT Pub. Date: Apr. 25, 2002

(65) Prior Publication Data

US 2004/0097624 A1    May 20, 2004

(30) Foreign Application Priority Data

Oct. 20, 2000  (FR) .................... 00 13447

(51) Int. Cl.
*C08L 51/00* (2006.01)
*C08F 8/14* (2006.01)

(52) U.S. Cl. ............... 524/505; 525/327.7; 525/328.9; 525/329.5; 525/333.3

(58) Field of Classification Search ............... 524/505; 525/327.7, 328.9, 329.5, 333.3
See application file for complete search history.

(56) References Cited

U.S. PATENT DOCUMENTS

| 4,369,284 A | 1/1983 | Chen ......................... 524/476 |
| H1022 H | 2/1992 | Holden et al. .............. 524/474 |
| 5,122,569 A * | 6/1992 | Scheibelhoffer et al. ...... 525/66 |
| 5,167,649 A | 12/1992 | Zook ......................... 604/307 |
| 5,552,495 A * | 9/1996 | Miller et al. ................. 525/437 |
| 6,576,712 B1 | 6/2003 | Feldstein et al. ........ 525/326.9 |
| 2004/0148003 A1* | 7/2004 | Udipi et al. ............... 623/1.11 |

FOREIGN PATENT DOCUMENTS

| CA | 2 426 251 A1 | 4/2002 |
| EP | 0 723 571 | 12/1998 |
| EP | 0 758 009 | 3/1999 |
| EP | 0 991 730 | 2/2003 |
| FR | 2 815 636 | 4/2002 |
| WO | WO 02/22735 | 3/2002 |

OTHER PUBLICATIONS

Liu et al, "Preparation and Spectroscopic Properties of Phenanthrene-Labeled SEBS Triblock Copolymers", Macromolecules, vol. 32, No. 12, pp. 3957-3963 (Apr. 27, 1999).*

(Continued)

*Primary Examiner*—Daniel S. Metzmaier
(74) *Attorney, Agent, or Firm*—Merchant & Gould P.C.

(57) ABSTRACT

The invention concerns copolymers of the poly(styrene)-poly(ethylene-butylene)-poly(styrene) type wherein the central poly(ethylene-butylene) sequence has been modified by chemical grafting of hydrophilic groups to make them amphiphilic. The invention also concerns a method for preparing said novel amphiphilic copolymers and their use in particular emulsifying agent or absorbent.

13 Claims, 2 Drawing Sheets

OTHER PUBLICATIONS

Al-Sabagh et al. "Water-based non-ionic polymeric surfactants as oil spill dispersants". *Journal of Chemical Technology and Biotechnology*, vol. 74, pp. 1075-1081 (May 22, 1999).

Quitana et al. "Crystallization and thermal behavior of poly (vinylidene fluoride)/.Poly [styrene-b-(ethylene-co-butylene)-b-styrene] blends functionalized with succinic groups". *Journal of Polymer Science: Part B: Polymer Physics*, vol. 32, pp. 201-204 (Mar. 11, 1993).

Lin et al. "Synthesis, characterization, and interfacial behaviors of poly(oxyethylene)-grafted SEBS copolymers". *Industrial & Engineering Chemistry Research*, vol. 39, No. 1, pp. 65-71 (Nov. 30, 1999).

Derwent Abstract, week 199347ndon: Derwent Publications Ltd., AN 1993-374751, JP 05-279623 A, (Nippon Steel Chem Co), abstract.

Donatas Satas (Ed.) *Handbook of Pressure Sensitive Adhesive Technology, Second Edition*, Chapter 13, pp. 317 to 359 (1989).

* cited by examiner

AMPHIPHILIC COPOLYMERS USEFUL ESPECIALLY AS EMULSIFIERS

The present invention relates to novel block copolymers of the polystyrene-poly(ethylene/butylene)-polystyrene type in which the poly(ethylene/butylene) mid block has been modified by the chemical grafting of hydrophilic groups to render the copolymers amphiphilic.

The invention further relates to a process for the preparation of these novel amphiphilic copolymers and to their use, especially as emulsifiers or absorption agents.

BACKGROUND OF THE INVENTION

Block copolymers of the ABA type, composed of a poly(ethylene/butylene) elastomeric mid block B and two polystyrene thermoplastic end blocks A, have been known for a long time and are abbreviated to SEBS.

Such products are marketed for example by SHELL under the trade name KRATON®.

These polymers are widely used in numerous applications such as the production of molded articles, for example shoe soles or coverings, or as binders or plasticizers in a variety of products and formulations, and finally as adhesives. Given their hydrocarbon nature, these SEBS copolymers are very hydrophobic and consequently are deficient in numerous applications, for example those requiring adhesion to a polar surface.

Therefore, there is also a modified SEBS whose elastomeric mid block contains a functional group chosen so as to allow the creation of interactions with polar surfaces.

This product is an SEBS maleic anhydride marketed by SHELL under the name KRATON G 1901®, which contains about 2% by weight of succinic anhydride groups attached to the poly(ethylene/butylene) mid chain.

The presence of succinic anhydride groups distributed along the mid chain thus affords a better adhesion to glass, textiles and metals.

However, although they have excellent mechanical properties and a good solubility in organic solvents, the hydrophobic nature of all these modified or unmodified SEBS makes them incompatible with hydrophilic products, which are consequently very difficult, if not impossible, to incorporate into formulations or products based on SEBS.

Although this incompatibility is certainly of no concern in applications such as the production of molded articles or coverings, it presents many more problems especially when these SEBS are used as adhesives, particularly in contact with skin or mucosae. In this case they are a basic component of formulations or products into which it is often desirable to incorporate hydrophilic compounds, for example for the production of patches in pharmacy or cosmetology, for the production of dressings in the treatment of blisters or corns, or in dermatology.

Thus, in this case, the incorporation of hydrophilic compounds, for example simply water, or an antiseptic, for example chlorhexidine digluconate, can be very useful or even essential. Now, the hydrophobic nature of the existing SEBS makes this incorporation very complex, if not impossible, depending on the nature or amounts of the hydrophilic compounds to be introduced.

As the products obtained are unstable, they require the incorporation of additives, which complicate their production, increase the cost, may introduce irritation problems, etc.

Likewise, the capacity of SEBS to absorb water or hydrophobic liquids is virtually zero. Thus, when they are used in the treatment of wounds, they are regularly mixed with other absorbent materials, such as cellulose derivatives, alginates or the like, to give an absorbent final product. The problem, as before, is that this physical mixing complicates the production of the formulations (problems of compatibility, viscosity, particle size, etc.), increases the risks of loss of cohesion of the product due to absorption, etc.

It would therefore be useful to have SEBS copolymers, particularly for the production of formulations that may or may not adhere to skin, wounds or mucosae, which have a better affinity towards hydrophilic compounds and liquids, thereby making it possible to solve the problems of formulation and absorption described above. It would also make it possible to extend the application interval and fields of application of these polymers.

The present invention relates to novel amphiphilic SEBS copolymers which meet these objectives and make it possible to solve these problems of the compatibility between SEBS and hydrophilic compounds and the affinity of SEBS for hydrophilic liquids.

Thus, according to a first feature, the present patent application aims to cover amphiphilic block copolymers of the ABA type containing two polystyrene thermoplastic end blocks A and one elastomeric mid block B, wherein this mid block B is a poly(ethylene/butylene) block containing grafted hydrophilic groups, it being possible for said amphiphilic copolymer ABA to be represented schematically by the following structure:

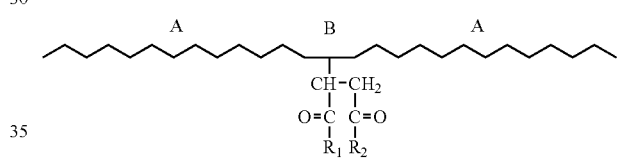

in which $R_1$ and $R_2$, which are identical or different, are hydrophilic groups with an average molecular weight below 10,000, selected from the following groups:

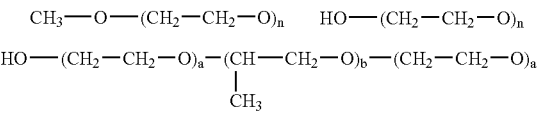

in which n, a and b are integers.

Advantageously, within the framework of the present invention, preferred amphiphilic copolymers will be those in which $R_1$ and $R_2$ are identical.

Among these amphiphilic copolymers, it will be preferable to use those in which $R_1$ and $R_2$ are a group $CH_3$—O—$(CH_2$—$CH_2$—O$)_n$, particularly those for which the average molecular weight of the group $CH_3$—O—$(CH_2$—$CH_2$—O$)_n$ varies between 1000 and 8000, and very particularly that which has an average molecular weight of 2000, i.e. n=45.

DESCRIPTION OF THE INVENTION

Figure 1:
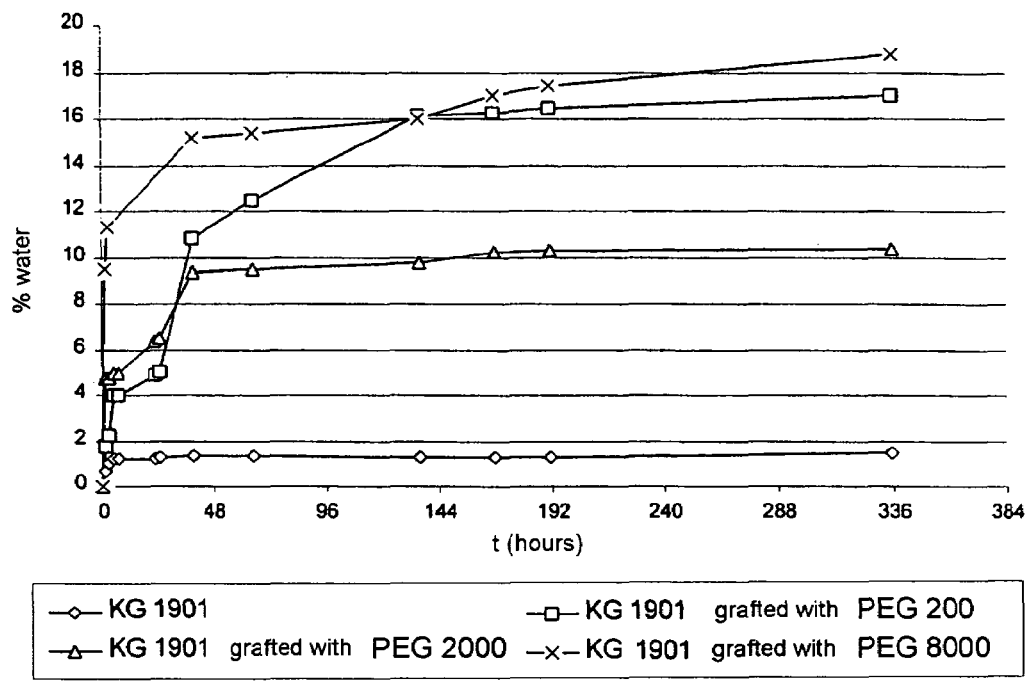
FIG. 1 shows the percentage of water absorbed as a function of time in examples 2, 4, and 6.

The amphiphilic copolymers according to the invention are obtained by grafting hydrophilic compounds onto a specific SEBS copolymer.

This specific copolymer contains succinic anhydride groups distributed along the poly(ethylene/butylene) elastomeric chain and obtained by reacting maleic anhydride with the poly(ethylene/butylene) block; it will subsequently be referred to as an SEBS maleic anhydride.

This SEBS maleic anhydride copolymer, which serves as the basis for production of the amphiphilic copolymers according to the invention, can be represented schematically by the following formula:

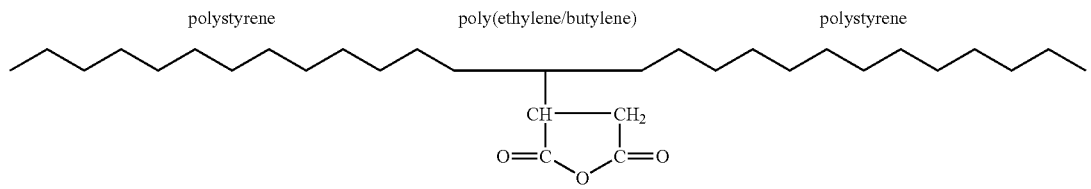

For reasons of simplicity, this formula shows only one succinic anhydride group on the poly(ethylene/butylene) block, although it is obvious that this block actually contains several succinic anhydride groups. This simplification has also been used for schematic representation of the copolymers according to the invention.

Within the framework of the present invention, preference will be given to an SEBS maleic anhydride marketed by SHELL under the name Kraton G 1901®, which contains 2% by weight of succinic anhydride groups attached to the elastomeric chain and 28% by weight of polystyrene.

It is these anhydride groups which will be used for grafting the hydrophilic compounds by a chemical reaction between the hydrophilic compound and the anhydride or its acid form.

In fact, depending on the storage conditions and particularly on the dryness of this SEBS maleic anhydride, some of these succinic anhydride groups may be in their acid form after the anhydride has opened in the presence of water. In that case the reaction also takes place between the acid groups and the hydrophilic compound.

Within the framework of the present invention, the hydrophilic compounds grafted onto the SEBS maleic anhydride are of 3 types:

A/Polyethylene Glycols, Abbreviated Hereafter to PEG

These are hydrophilic, hygroscopic and thermally stable polymers. They are used in a very large number of industrial fields. They are well known to those skilled in the art. These polymers have short chains with hydroxyl groups at the ends. Their average molecular weight varies from 200 to 20,000.

Their composition corresponds to the following structure:

$$HO-(CH_2-CH_2-O)_n-H$$

in which n is an integer.

Such products are marketed for example by Aldrich under the name polyethylene glycol followed by the average molecular weight of the PEG in question, for example polyethylene glycol 2000.

Within the framework of the present invention, only PEG with an average molecular weight less than or equal to about 10,000 (n therefore having a maximum value of 230) are used. In fact, beyond this value, the grafting reaction becomes difficult, if not impossible.

Advantageously, the PEG used will have an average molecular weight of between 1000 and 8000 and particularly an average molecular weight of 2000 (n=45).

B/Polyethylene Glycol Monomethyl Ethers, Abbreviated Hereafter to PEGME

Again these are short-chain polymers which, like PEG, are used in a very large number of fields and are well known to those skilled in the art.

They have the following structure:

$$CH_3-O-(CH_2-CH_2-O)_n-H$$

in which n is an integer, and their average molecular weight varies from 200 to 20,000.

Such products are marketed for example by Aldrich under the name polyethylene glycol methyl ether followed by the average molecular weight of the PEGME in question, for example polyethylene glycol methyl ether 2000.

Within the framework of the present invention, in just the same way as for PEG, only those PEGME with an average molecular weight less than or equal to about 10,000 (n having a maximum value of 230) are used.

Advantageously, the PEGME used will have an average molecular weight of between 1000 and 8000 and particularly an average molecular weight of 2000 (n=45).

C/Polyethylene Glycol/Polypropylene Glycol Copolymers

These are very well-known copolymers which will be abbreviated hereafter to PEO/PPO/PEO.

These are tri-block copolymers whose mid part is a polypropylene oxide block and whose ends are polyethylene oxide blocks; they have the following structure:

$$H-O-(CH_2-CH_2-O)_a-(CH(CH_3)-CH_2-O)_b-(CH_2-CH_2-O)_a-H$$

in which a and b are integers.

They are often designated by the general term poloxamers.

A very large number of grades exist for these products and they are characterized by the values of a and b that define their average molecular weights. The following may thus be mentioned:

poloxamer 124: a=12, b=20, average molecular weight between 2090 and 2360 poloxamer 188: a=80, b=27, average molecular weight between 7680 and 9510 poloxamer 407: a=101, b=56, average molecular weight between 9840 and 14,600.

They are marketed for example by BASF under the name Pluronic®.

Here again, as previously, only those PEO/PPO/PEO with an average molecular weight less than or equal to about 10,000 will be used.

Within the framework of the present invention, preference will be given to a PEO/PPO/PEO with a molecular weight of about 2000, for example the product marketed by Aldrich under the name poly(ethylene glycol)-block-poly(propylene glycol)-block-poly(ethylene glycol) 1900, which has an average molecular weight of 1900.

The amphiphilic copolymers according to the invention can easily be prepared by an esterification reaction between the succinic anhydride groups of the SEBS maleic anhydride and the hydroxyl groups of the PEG, PEGME or PEO/PPO/PEO used.

The reaction of an alcohol with an anhydride group reversibly gives an ester. Within the framework of the present invention, this esterification can be represented by the following simplified scheme:

separately by heating the latter to its (their) melting point in a solvent, preferably toluene, with agitation. An excess of hydrophilic compounds is advantageously used. The number of hydroxyl groups relative to the number of anhydride groups can thus vary from 2.5 to 20.

A catalytic amount (about 15 to 25 drops) of an acid, for example sulfuric acid, and then the previously prepared solution of hydrophilic compound(s) in the solvent are added to the previously prepared solution of SEBS maleic anhydride copolymer, with agitation and still under reflux.

This mixture is agitated under reflux and under azeotropic distillation for 30 minutes to 5 hours, depending on the nature of the hydrophilic compound(s), until the esterification reaction between the anhydride groups (possibly in their acid form) of the succinic groups of the SEBS maleic anhydride and the hydroxyl groups of the hydrophilic compound(s) is complete. The progress of the reaction is followed using the techniques well known to those skilled in the art, for example by infrared spectroscopy until the carbonyl absorption peak of the anhydride, i.e. 1785 cm$^{-1}$, has disappeared.

The reaction mixture is then precipitated hot at about 90–100° C. in an appropriate precipitation solvent such as ethanol or an ethanol/water mixture, said precipitation solvent representing about 4 times the volume of all the reaction solvents used.

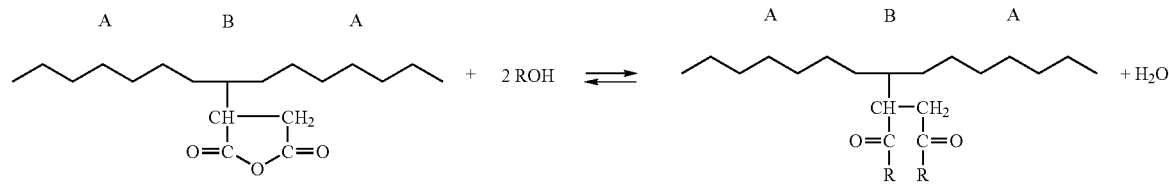

The esterification reaction is promoted by introducing excess hydroxyl groups relative to anhydride groups. The reaction is advantageously catalyzed by an acid, and the water formed is removed by azeotropic distillation to shift the equilibrium towards the grafted product. The reaction is preferably carried out under an inert atmosphere.

According to a second feature of the invention, a process for the preparation of said amphiphilic copolymers is therefore also recommended, in which process an esterification reaction is carried out between the succinic anhydride groups carried by the poly(ethylene/butylene) part of a polystyrene-poly(ethylene/butylene)-polystyrene copolymer (SEBS maleic anhydride) and the hydroxyl groups of a hydrophilic compound selected from polyethylene glycols (PEG), polyethylene glycol monomethyl ethers (PEGME) and polyethylene glycol/polypropylene glycol copolymers (PEO/PPO/PEO) with an average molecular weight less than or equal to 10,000, or mixtures thereof, preferably in the presence of an acidic catalyst, with removal of the water formed and with an excess of hydroxyl groups relative to succinic anhydride groups of the SEBS maleic anhydride.

The synthetic process is more precisely as follows:

The SEBS maleic anhydride is dissolved in a solvent, preferably toluene, under the action of heat (at about 120° C., the reflux temperature of the solvent) and with agitation.

A solution of at least one hydrophilic compound (PEG, PEGME, PEO/PPO/PEO or a mixture thereof) is prepared After filtration, the residual solvents are removed from the resulting amphiphilic SEBS copolymer by evaporation in an oven at 40–50° C. under vacuum.

It is then necessary to purify said copolymer in order to remove any remaining hydrophilic compound(s), PEG, PEGME or PEO/PPO/PEO, used in excess.

The amphiphilic polymer obtained is therefore redissolved at about 90 to 110° C. in toluene, with agitation, and the resulting solution is reprecipitated in the same volume of the same solvent as in the precipitation step previously carried out at the end of the synthesis.

Likewise, the amphiphilic SEBS copolymer is recovered by filtration and dried again in an oven at 40–50° C. under vacuum.

This purification step is repeated until the hydrophilic compound(s) has (have) been totally removed, using gel permeation chromatography (GPC) to verify the absence of the peak corresponding to the latter, according to the techniques known to those skilled in the art.

According to a third feature, the present patent application aims to cover the use of an amphiphilic copolymer according to the invention as an emulsifier or as an absorption agent.

In fact, by virtue of their novel chemical structure, the amphiphilic copolymers according to the invention are no longer hydrophobic, like the SEBS copolymers known hitherto, but possess both a hydrophobic part and a hydrophilic part. This duality will therefore modify their wetting and compatibility properties with hydrophilic or hydrophobic products, thereby enabling them to be used for new purposes, for example as absorption agents or emulsifiers.

These novel amphiphilic copolymers are particularly advantageous in that they allow the incorporation of hydrophilic products or the absorption of greater or lesser quantities of hydrophilic liquids into compositions based on SEBS. These compositions open up new fields of application for SEBS, especially the manufacture of products in which they come into contact with skin, wounds or mucosae, for example in pharmacy, cosmetology or dermatology.

Of course, this list does not imply a limitation and the present patent application aims to cover the use of said amphiphilic copolymers in all fields and for all applications in which their absorption capacity or their emulsifying power can be used.

The advantages and characteristics of the invention will be understood more clearly from the following description of Examples of production and use.

Of course, these details as a whole do not imply a limitation but are given by way of illustration.

Synthesis of the Amphiphilic Copolymers

The synthetic process described above is applied for all these Examples. All these syntheses use a reactor fitted with a condenser equipped with a drying tube, a chamber connected to a vacuum and to nitrogen if the reaction is performed under an inert atmosphere, and a Dean-Stark apparatus to remove the water formed by azeotropic distillation.

EXAMPLE 1

150 ml of toluene are introduced into the reactor under nitrogen and 20 g of Kraton G 1901® (SEBS maleic anhydride copolymer), marketed by SHELL, are added. The mixture is refluxed (at about 110° C.), with agitation, until all the SEBS maleic anhydride copolymer has dissolved. A solution of PEGME of molecular weight 2000, marketed by Aldrich under the name polyethylene glycol methyl ether 2000, is prepared separately by dissolving 32.32 g of PEGME 2000 in 100 ml of toluene by heating to its melting point, with agitation. About 20 drops of sulfuric acid are added to the previously prepared solution of SEBS maleic anhydride copolymer, still under reflux and with agitation. The previously prepared solution of PEGME 2000 in toluene is then added, still under reflux and with agitation. Thus, in this case, there are 4 hydroxyl groups per anhydride group. The mixture obtained is agitated, still under reflux, until the esterification reaction is complete, i.e. for about 30 to 40 minutes in this instance. The solution is then precipitated hot at about 90 to 100° C. in 1.5 liters of a 50/50 water/ethanol mixture.

After filtration, the residual solvents are removed from the resulting precipitate by evaporation in an oven at 40–50° C. under vacuum. To purify the amphiphilic polymer obtained, it is necessary to remove the excess PEGME 2000 which has not reacted during the synthesis. This is done by redissolving the amphiphilic polymer hot at about 90–100° C. in 100 to 150 ml of toluene, with agitation, and reprecipitating the resulting solution in 1.5 liters of a 50/50 water/ethanol mixture. After filtration, the recovered precipitate is dried in an oven at 40–50° C. under vacuum. This purification step (redissolution-precipitation and drying under vacuum) is repeated until all the PEGME 2000 has been removed.

EXAMPLES 2 TO 10

The procedure is identical to that of Example 1 for grafting PEG and PEGME of different average molecular weights and a PEO/PPO/PEO of average molecular weight 1900 onto 20 g of Kraton G 1901®. The compounds marketed by Aldrich under the following names were grafted in this way:

polyethylene glycol 200 (abbreviated hereafter to PEG 200, Example 2)
polyethylene glycol 600 (abbreviated hereafter to PEG 600, Example 3)
polyethylene glycol 2000 (abbreviated hereafter to PEG 2000, Example 4)
polyethylene glycol 4600 (abbreviated hereafter to PEG 4600, Example 5)
polyethylene glycol 8000 (abbreviated hereafter to PEG 8000, Example 6)
polyethylene glycol methyl ether 350 (abbreviated hereafter to PEGME 350, Example 7)
polyethylene glycol methyl ether 550 (abbreviated hereafter to PEGME 550, Example 8)
polyethylene glycol methyl ether 5000 (abbreviated hereafter to PEGME 5000, Example 9)
poly(ethylene glycol)-block-poly(propylene glycol)-block-poly(ethylene glycol) 1900 (abbreviated hereafter to PEO/PPO/PEO 1900, Example 10) Table I collates the various data relating to all these syntheses.

Q: amount of hydrophilic compound added, expressed in grams
V: volume of toluene in ml used to dissolve the hydrophilic compound
SP: percentage composition by volume of precipitation solvent for precipitating and purifying the amphiphilic copolymer at the end of the reaction
n: ratio of the number of hydroxyl groups of the hydrophilic compound to the number of anhydride groups available on the SEBS maleic anhydride

TABLE I

| Example | Nature of the hydrophilic compound | Q | V | n | SP ethanol/ | water |
|---|---|---|---|---|---|---|
| 1 | PEGME 2000 | 32.32 | 100 | 4 | 50 | 50 |
| 2 | PEG 200 | 16.16 | 20 | 20 | 100 | 0 |
| 3 | PEG 600 | 48.48 | 60 | 20 | 100 | 0 |
| 4 | PEG 2000 | 86.8 | 80 | 10 | 50 | 50 |
| 5 | PEG 4600 | 73.4 | 120 | 4 | 50 | 50 |
| 6 | PEG 8000 | 80.8 | 150 | 2.5 | 50 | 50 |
| 7 | PEGME 350 | 11.2 | 20 | 8 | 100 | 0 |
| 8 | PEGME 550 | 8.9 | 20 | 4 | 100 | 0 |
| 9 | PEGME 5000 | 60.6 | 120 | 3 | 50 | 50 |
| 10 | PEO/PPO/PEO 1900 | 76.7 | 90 | 20 | 100 | 0 |

Hydrophilicity of the Amphiphilic Copolymers

The hydrophilicity of the amphiphilic copolymers according to the invention can be demonstrated by means of contact angle measurements.

This method is generally used to evaluate the wettability of a solid by a liquid by studying the ability of the liquid to occupy the greatest possible surface area when deposited on the solid.

Thus, when using a drop of water as the liquid, it is possible to characterize the hydrophilicity of the material used. A hydrophilic material absorbs the drop of water. If the drop of water is not absorbed, measurement of the contact angle it forms on the material on which it is deposited makes it possible to evaluate the affinity of said material for water and hence its hydrophilicity.

The drop of water is therefore more or less flattened according to the hydrophilicity of the test material, and adopts different geometries, giving rise to different contact angles.

Thus, if the drop does not wet the solid, the angle is equal to 180 degrees, whereas if the drop totally wets the solid, the angle is equal to 0 degrees.

This method of contact angle measurement was therefore used to evaluate the hydrophilicity of the amphiphilic copolymers according to the invention and of the initial SEBS maleic anhydride.

The measurements were made under the following conditions:

250 µm thick films of amphiphilic copolymers according to the invention are produced hot under a hydraulic press. Approx. 10 cm$^2$ samples are cut out with a hollow punch and left at 23° C. for 24 hours.

The samples are stuck to a microscope slide using double-sided adhesive tape.

A syringe is used to deposit a drop of water of constant volume on the film.

The drop is filmed with a camera and the values of the contact angles are obtained automatically by means of an automatic apparatus for the dynamic measurement of contact angle, DIGIDROP® no. 3160, which analyzes the video images of the drop of water.

As the surface condition in the majority of cases causes a dissymmetry of the drop and hence different contact angles on the right and left, the DIGIDROP® apparatus averages the 2 angles to compensate for this error.

3 films are studied for each polymer. Three drops of water are applied for each film and 2 measurements are made for each drop.

The results obtained are collated in Table II, in which the values of the contact angles, i.e. the average of all these measurements, are given in degrees.

TABLE II

| Product | Nature of the grafted hydrophilic compound | Contact angle |
| --- | --- | --- |
| KRATON G 1901 | — | 95 |
| Example 2 | PEG 200 | 86 |
| Example 3 | PEG 600 | 85 |
| Example 4 | PEG 2000 | 76 |
| Example 6 | PEG 8000 | 72 |
| Example 7 | PEGME 350 | 87 |
| Example 8 | PEGME 550 | 86 |
| Example 1 | PEGME 2000 | 75 |
| Example 10 | PEO/PPO/PEO 1900 | 75 |

Analysis of the results in Table II clearly shows that the amphiphilic copolymers according to the invention have a better affinity for water than SEBS maleic anhydride (KRATON G 1901®). There is a 10 to 20 degree decrease in contact angle, depending on the particular case.

It is also found that this affinity for water, and hence the hydrophilicity of the amphiphilic copolymers, can be modulated by varying the nature of the grafted hydrophilic compound and particularly the length of the PEG or PEGME chain. The value of the contact angle decreases with increasing chain length. Thus the angle decreases from 86 degrees to 72 degrees when PEG 8000 is grafted instead of PEG 200. Likewise, the angle decreases from 87 degrees to 75 degrees when PEGME 2000 is grafted instead of PEGME 550.

The amphiphilic copolymers according to the invention therefore have a better affinity for hydrophilic liquids and a greater hydrophilicity than that of the known SEBS copolymers.

Absorption Capacity of the Amphiphilic Copolymers

By virtue of this affinity and their more hydrophilic nature, the amphiphilic copolymers according to the invention have a greater absorption capacity for hydrophilic liquids than the SEBS known hitherto.

To demonstrate the significant increase in this absorption capacity, the amount of water absorbed by films of amphiphilic copolymers according to the invention and of Kraton G 1910® was measured by the method described below.

To carry out these measurements, copolymer films with a diameter of 2 cm and a thickness of 500 µm are produced. These films are obtained hot under a hydraulic press and cut out to the desired dimensions using a hollow punch. The absorption capacity is measured by weight difference and corresponds to the amount of water absorbed by the film after a time t. It is expressed as a percentage.

The initial weight of the film, mo, is determined.

The film is then placed in a chamber (leaktight desiccator) saturated with water vapor at 100% humidity.

The temperature of the leaktight desiccator is kept constant by placing it in a thermoregulated oven. The measurements are made at a temperature of 37° C.

After a certain time t, the film is recovered and weighed, mt being the weight of the film at time t.

The percentage of water absorbed is calculated from the formula $$\frac{mt - mo}{mt} \times 100$$

Two films are produced for each polymer sample studied. 2 measurements are made for each film and all these measurements are averaged.

This method was used to measure the absorption capacity of the SEBS maleic anhydride Kraton G 1901® (abbreviated to KG 1901 below) and of amphiphilic copolymers obtained above, namely KG 1901 grafted with PEGME 200 (Example 1), KG 1901 grafted with PEG 200 (Example 2), KG 1901 grafted with PEG 2000 (Example 4), KG 1901 grafted with PEG 8000 (Example 6), KG 1901 grafted with PEGME 350 (Example 7), KG 1901 grafted with PEGME 550 (Example 8) and KG 1901 grafted with PEO/PPO/PEO 1900 (Example 10).

Figure 2:
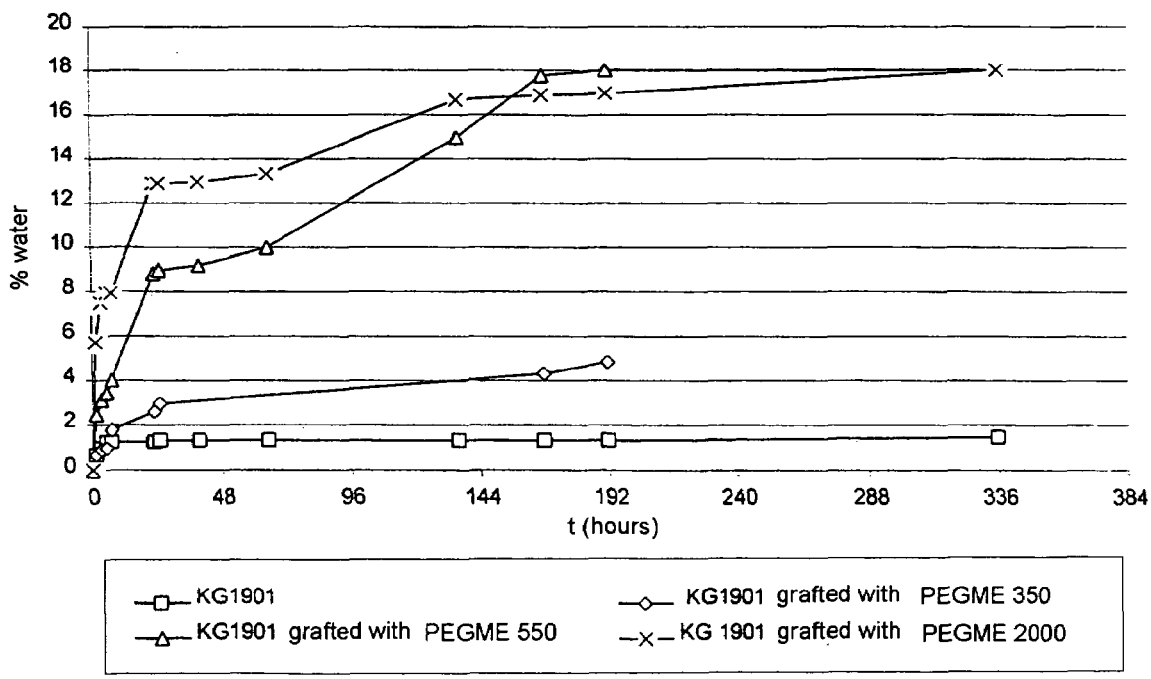
FIG. 2 shows the percentage of water absorbed as a function of time in examples 1, 7, and 8.
Figure 3:
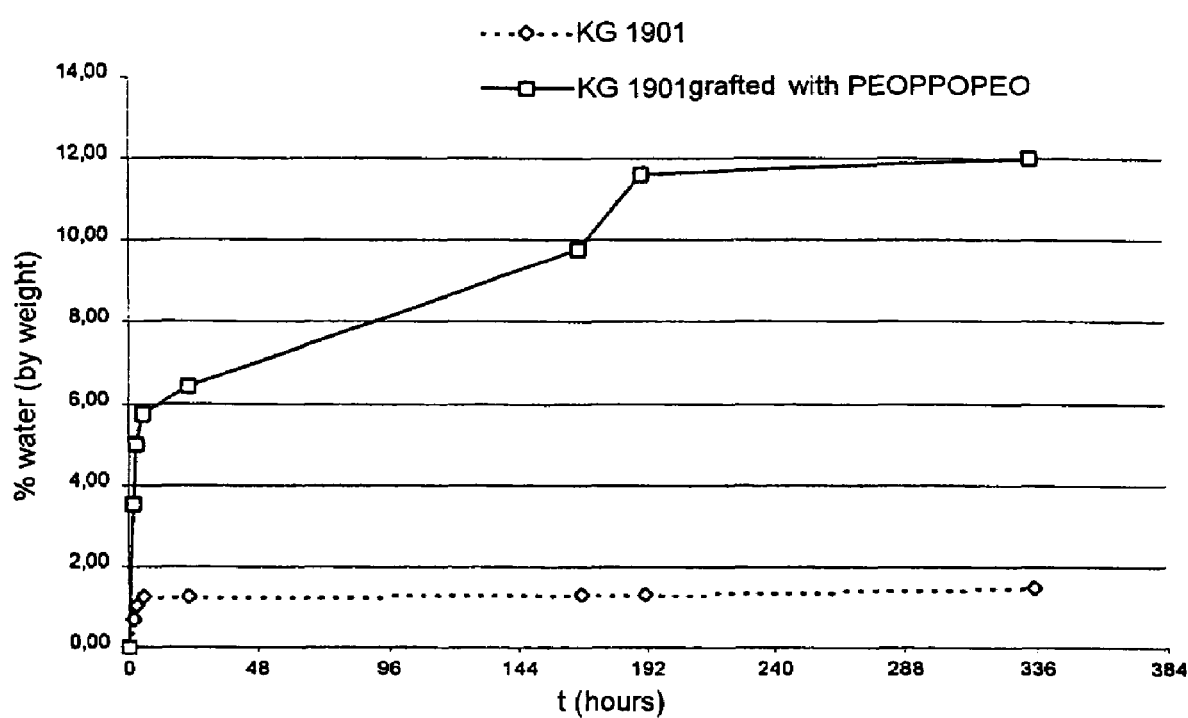
FIG. 3 shows the percentage of water absorbed as a function of time in example 10.

The results obtained are illustrated in FIGS. 1, 2 and 3, in which the percentage of water absorbed, measured by the method described above, has been shown as a function of time, expressed in hours.

More precisely:

FIG. 1 shows the percentage of water absorbed as a function of time, expressed in hours, by Kraton G 1901® (KG 1901) and the copolymers of Examples 2, 4 and 6 (amphiphilic copolymers based on PEG), i.e. KG 1901 grafted with PEG 200, KG 1901 grafted with PEG 2000 and KG 1901 grafted with PEG 8000, respectively.

FIG. 2 shows the percentage of water absorbed as a function of time, expressed in hours, by Kraton G 1901®(KG 1901) and the copolymers of Examples 1, 7 and 8 (amphiphilic copolymers based on PEGME), i.e. KG 1901 grafted with PEGME 2000, KG 1901 grafted with PEGME 350 and KG 1901 grafted with PEGME 550, respectively.

FIG. 3 shows the percentage of water absorbed as a function of time, expressed in hours, by Kraton G 1901® (KG 1901) and the amphiphilic copolymer of Example 10 based on PEO/PPO/PEO 1900, abbreviated to KG 1901 grafted with PEO/PPO/PEO.

Analysis of these 3 Figures shows the significant increase in the absorption capacity of the amphiphilic copolymers according to the invention compared with the SEBS maleic anhydride Kraton G 1901®, which has a hydrophobic nature. It can also be seen in each Figure that this increase is visible as from the first few hours. Furthermore, in contrast to Kraton G 1901®, the absorption capacity increases over time until it reaches a plateau between 6 and 8 days.

These two phenomena (speed of absorption and change over time) can be of particular value in applications such as the treatment of wounds, where these two properties are sought independently or simultaneously. Contact angle measurements had demonstrated that the hydrophilic affinity of the amphiphilic copolymers increased with the length of the PEG or PEGME chain. This property is represented here by an increase in the absorption capacity of the amphiphilic copolymers.

Thus, in the case illustrated in FIG. 1, whereas Kraton G 1901® absorbs at most 1.5% of water, Kraton grafted with PEG 200 already absorbs 10% of water, i.e. about 10 times more, and Kraton grafted with PEG 2000 and 8000 absorb almost 20% of water, i.e. about 20 times more.

An analogous result is found again in the case illustrated in FIG. 2 for Kraton 1901 grafted with PEGME.

The present invention therefore provides a range of amphiphilic copolymers that can be used as absorption agents, from which it is possible to choose the one whose absorption capacity is best suited (low, rapid, durable, high) to the pursued objective.

For example, the production of formulations based on SEBS and other absorbent polymers, such as alginates or cellulose derivatives, may be simplified by reducing the amount of the latter or even omitting them. This will favor the compatibility between these various compounds and the risks of loss of cohesion of the final products after absorption will thereby be reduced.

Likewise, in the production of cosmetic or pharmaceutical patches, the capacity to absorb secretions or perspiration can be an important factor in the manufacture of such products.

Use of the Amphiphilic Copolymers as Emulsifiers

The amphiphilic copolymers according to the invention have a further advantage over and above their absorption capacity and hence their use as absorption agents.

In fact, depending on the nature of the hydrophilic compound grafted onto the SEBS maleic anhydride, it is possible to modulate their affinity for hydrophobic media (such as oils) and hydrophilic media (such as water). They can therefore be employed with these two media simultaneously. Thus a family of novel compounds are now available which, depending on the nature of the hydrophilic compound and particularly the length of the PEG, PEGME or PEO/PPO/PEO chain, can be used to produce or stabilize water-in-oil mixtures, oil-in-water mixtures or even both, leading to their use as emulsifiers.

This other application of the amphiphilic copolymers according to the invention is illustrated by the following experiments, in which their capacity as emulsifiers was evaluated by studying the stability of various emulsions incorporating them.

Emulsions based on water and oil containing 1% of amphiphilic copolymer according to the invention are prepared. The amount of oil and water is varied from one experiment to the next in order to prepare emulsions containing 25% of water —75% of oil, 50% of water —50% of oil or 75% of water —25% of oil.

The water and oil are simultaneously added gradually to a beaker containing the polymer agitated at about 100 rpm with a Rayneri mixer and kept at a temperature of about 90–100° C. with an oil bath.

After half an hour, when all the ingredients are well homogenized, the heating and agitation are stopped, the emulsion formed is left to stand and its appearance is observed.

The following are thus prepared for a total of 150 g of polymers, water and oil:
a 50/50 water-in-oil emulsion containing 1.5 g of polymer, 74.25 g of water and 74.25 g of oil
a 25/75 oil-in-water emulsion containing 1.5 g of polymer, 49.5 g of oil and 99 g of water
a 25/75 water-in-oil emulsion containing 1.5 g of polymer, 49.5 g of water and 99 g of oil.

In reality, because of the evaporation of water due to the high temperature, the amount of water added is greater than the theoretically required amount in order to come as close as possible to the intended theoretical water/oil distribution (deviation below 3%).

These emulsions are prepared using distilled water and, as the oil, a mineral oil marketed by Shell under the name ONDINA 15 ®.

The following were thus tested as emulsifiers: a non-functionalized SEBS marketed by Shell under the name Kraton G 1652®, the SEBS maleic anhydride marketed by Shell under the name Kraton G 1901® and 2 amphiphilic copolymers according to the invention, the one being based on PEGME, namely the product of Example 1 based on PEGME 2000, and the other being based on PEG, namely the product of Example 6 based on PEG 8000.

The results obtained are collated in Table III.

TABLE III

| Polymer | Water/oil distribution | Appearance of the emulsion |
|---|---|---|
| KRATON G 1652 | 50/50 | not stable, immediate demixing |
| KRATON G 1901 | 50/50 | not stable, immediate demixing |
| Example 1 | 50/50 | stable, no change after 3 weeks |
| Example 1 | 25/75 | stable, no change after 3 weeks |
| Example 1 | 75/25 | stable, no change after 3 weeks |
| Example 6 | 25/75 | unstable, degrades over time |
| Example 6 | 75/25 | stable, no change after 3 weeks |

An analysis of Table III shows that it is impossible to produce an emulsion with the currently available SEBS (Kraton G 1652 and Kraton G 1901®). As soon as the heating and agitation are stopped, 2 separate water and oil phases are seen to appear.

On the other hand, amphiphilic copolymers according to the invention, grafted with PEGME or PEG, afford stable emulsions which do not change over time, so these products act as emulsifiers at a low concentration in the order of 1%.

According to how pronounced their hydrophilicity is, they can be useful in a wide range of emulsions.

Thus the amphiphilic copolymer of Example 1 grafted with PEGME 2000 makes it possible to prepare water-in-oil emulsions (25/75), oil-in-water emulsions (25/75) and oil-in-water emulsions (50/50).

On the other hand, the amphiphilic copolymer of Example 6, which definitely has a higher affinity for water due to a greater chain length (8000 as opposed to 2000), makes it possible to prepare a stable oil-in-water emulsion (25/75) but not a water-in-oil emulsion (25/75).

According to their nature, the amphiphilic copolymers according to the invention can therefore be used as emulsifiers in the manufacture of a very wide variety of emulsions. This is an important advantage which opens up a new and very vast field of applications for the production of novel formulations from SEBS in numerous fields, particularly pharmacy, cosmetology or dermatology.

What is claimed is:

1. Amphiphilic block copolymers of the ABA type containing two polystyrene thermoplastic end blocks A and one elastomeric mid block B, wherein the mid block B is a poly(ethylene/butylene) block containing grafted hydrophilic groups, said amphiphilic copolymer ABA represented by the following structure:

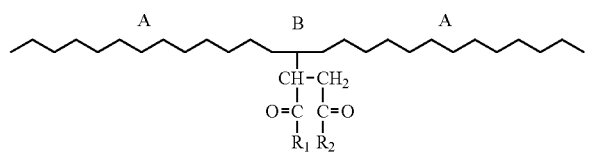

wherein $R_1$ and $R_2$, are identical or different, are hydrophilic groups with an average molecular weight below 10,000, selected from the group:

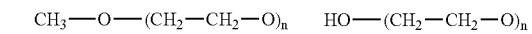
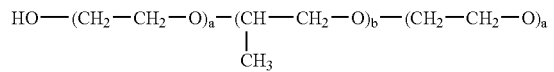

wherein n is an integer and average molecular weight of the hydrophilic groups is 200–10,000 and wherein a and b are integers and average molecular weight of the hydrophilic groups is 1900–10,000.

2. The amphiphilic copolymers of claim 1 wherein $R_1$ and $R_2$ are identical.

3. The amphiphilic copolymers of claim 2 wherein $R_1$ and $R_2$ are $CH_3-O-(CH_2-CH_2-O)_n$.

4. The amphiphilic copolymers of claim 3 wherein $R_1$ and $R_2$ are $CH_3-O-(CH_2-CH_2-O)_n$ and have an average molecular weight of between 200 and 8000.

5. The amphiphilic copolymers of claim 3 wherein $R_1$ and $R_2$ are $CH_3-O-(CH_2-CH_2-O)_n$ and have an average molecular weight of between 1000 and 8000.

6. The amphiphilic copolymers of claim 2 wherein $R_1$ and $R_2$ are $HO-(CH_2-CH_2-O)_n$.

7. The amphiphilic copolymers of claim 6 wherein $R_1$ and $R_2$ are $HO-(CH_2-CH_2-O)_n$ and have an average molecular weight of between 1000 and 8000.

8. The amphiphilic copolymers of claim 6 wherein $R_1$ and $R_2$ are $HO-(CH_2-CH_2-O)_n$ and have an average molecular weight of 2000.

9. The amphiphilic copolymers of claim 2 wherein $R_1$ and $R_2$ are

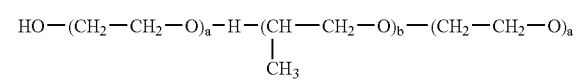

and have an average molecular weight of 1900.

10. An amphiphilic block copolymer of the ABA type containing two polystyrene thermoplastic end blocks A and one elastomeric mid block B, wherein the mid block B is a poly(ethylene/butylene) block containing grafted hydrophilic groups, said amphiphilic copolymer ABA is represented by the following structure:

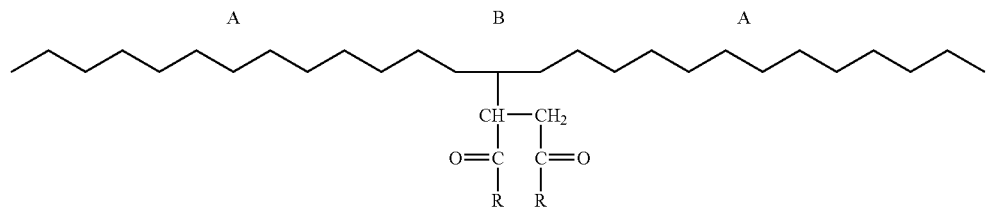

wherein R is $CH_3-O-(CH_2-CH_2-O)_n$, and has an average molecular weight of 2000.

11. A process for the preparation of the amphiphilic copolymer according to claim 1, wherein the process comprises:

esterifying amphiphilic block copolymers containing grafted succinic anhydride groups on the poly(ethylene/butylene) part of a polystyrene-poly(ethylene/butylene)-polystyrene copolymer with hydroxyl groups selected from the group consisting of:

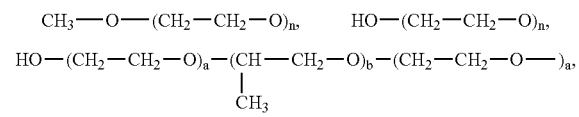

and mixtures thereof, with an average molecular weight less than or equal to 10,000; in the presence of an acid catalyst and removing water formed by the reaction.

12. A composition comprising an emulsifier, wherein the emulsifier is an amphiphilic copolymer according to claim 1.

13. A composition comprising an absorption agent, wherein the absorption agent is an amphiphilic copolymer according to claim 1.

* * * * *